June 7, 1949.  A. E. ROGERS  2,472,439
DEVICE FOR TEACHING ARITHEMETIC
Filed Oct. 5, 1945   2 Sheets-Sheet 1
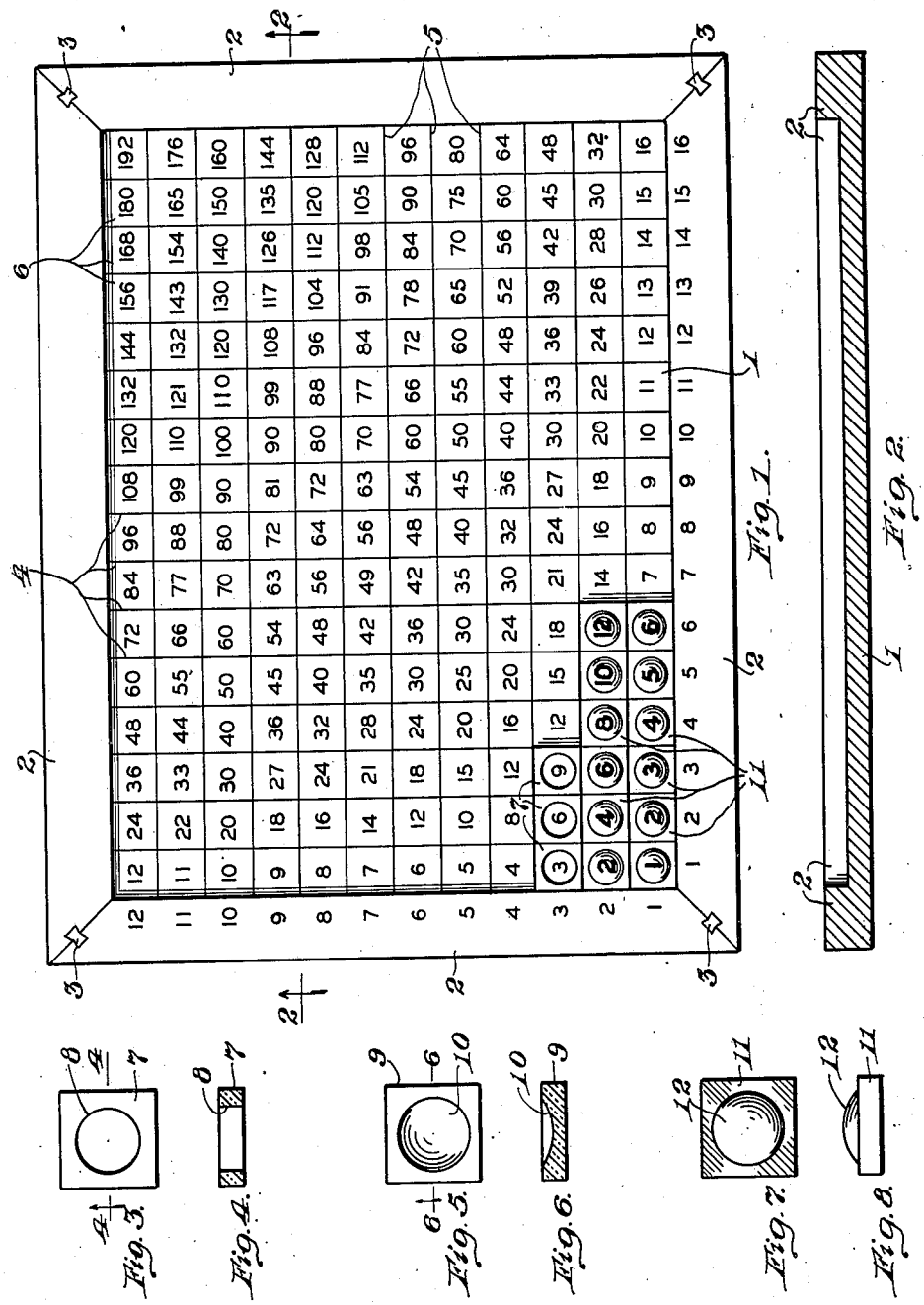
INVENTOR,
Alban E. Rogers,
BY J. Stuart Freeman.
Attorney.

June 7, 1949.  A. E. ROGERS  2,472,439
DEVICE FOR TEACHING ARITHEMETIC
Filed Oct. 5, 1945  2 Sheets-Sheet 2
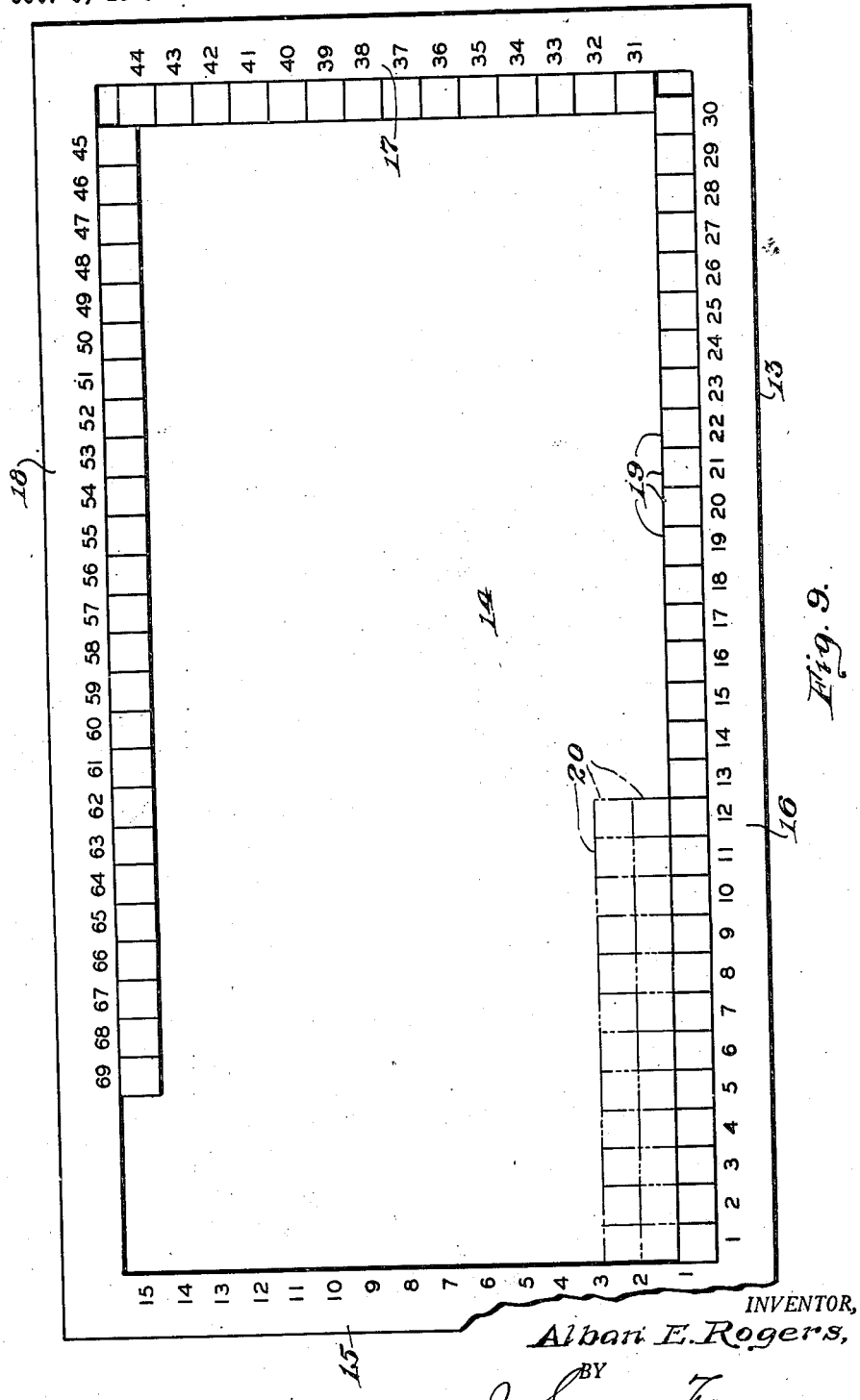
INVENTOR,
Alban E. Rogers,
BY
J. Stuart Freeman,
Attorney.

Patented June 7, 1949

2,472,439

UNITED STATES PATENT OFFICE 2,472,439

DEVICE FOR TEACHING ARITHMETIC

Alban E. Rogers, Swarthmore, Pa.

Application October 5, 1945, Serial No. 620,556

1 Claim. (Cl. 35—31)

The object of the invention is to provide improvements in means for teaching arithmetic, either in schools or in the home, and to teach it in such a manner that the results of addition, subtraction, multiplication and division are instantly visualized, and so clearly that the pupil readily sees and appreciates the reason for the results obtained, without in the slightest degree depending upon a mere faith in, or verbal assurance of, his teacher.

More specifically, the invention comprises a flat surface, such as can be provided by a portable board or the like, or a table for that matter, upon which any one or more types of preferably rectangular members may be placed and moved, so as to indicate by and at the intersection of vertical and horizontal numbered rows or lines the arithmetical results of the operation involved.

A further object is to provide a board having marginal rows of numerals consecutively arranged, upon either or both of the top and bottom margins, and at the same time similar rows of consecutive numerals upon either or both of the left and right hand margins, while the body of the board carries at the intersection of the coordinates of said marginal figures the different figures required to indicate the product of each combination of figures found in said horizontal and vertical rows, as hereinafter set forth.

Still another object is to provide movable training members of different types, any one or more of which may be used when instructing the pupil in arithmetical problems, said members in each instance preferably being rectangular in shape and provided with, either a central hole or depressed portion in which one's finger tip can enter to facilitate movement of such members, or with a convex central portion, especially when formed of transparent material, that effects an enlargement or magnification of the numerals beneath such member, wherever it may be placed upon the board, thereby accentuating the number beneath said member that represents the product of a figure in the vertical marginal column multiplied by the same or another figure in the horizontal margin.

With the objects thus briefly stated, the invention comprises further details of construction and operation, as hereinafter fully brought out in the following description, when read in conjunction with the accompanying drawings, in which Fig. 1 is a plan view of a board and a group of indicating members thereon, comprising one embodiment of the invention; Fig. 2 is a central vertical section of the same on the line 2—2 of Fig. 1; Fig. 3 is a plan view of one form of indicating member; Fig. 4 is a central vertical section of the same on the line 4—4 of Fig. 3; Fig. 5 is a plan view of a modified form of such member, having a central concave area in lieu of the aperture of Figs. 3 and 4; Fig. 6 is a central vertical section on the line 6—6 of Fig. 5; Fig. 7 is a plan view of a modified form of said member, formed of transparent material and having a central convex upper surface providing a magnifying area, through which the numerals on the board are visually enlarged; Fig. 8 is a side elevation of the same; and Fig. 9 is a plan view of a modified form of the device.

Referring to the drawings; a preferably rectangular board 1 is provided with a marginal portion 2 of increased thickness, which if formed of separate frame sections secured to a thinner base section may be secured together by any suitable means, such as the double dovetailed elements 3. The left hand marginal portion or section of said frame is, in the example shown, provided with consecutive numerals from 1 to 12, while the lower marginal portion of said frame is provided with consecutively arranged numerals from 1 to 16, it being understood that instead of an oblong board of the proportion 12 to 16, another proportion of board may be provided, including those which are square, or either oblong or square that are smaller or larger than the one illustrated. Furthermore, the numerals may be duplicated upon the right hand and top marginal portions of the frame, if desired.

The central body portion of said board is provided with equally spaced, vertical lines 4 and similarly spaced horizontal lines 5. These lines intersect to form squares 6, in which numerals are provided to indicate the product obtained by multiplying each numeral on the left hand margin with each of the numerals on the lower margin in turn and consecutively. As an illustration, the space at the intersection of the horizontal row identified by the numeral "7" with the vertical row identified by the numeral "11" carries the product of these two numbers, namely, "77."

To use the device, any suitable form of movable training members may be used, but those found to be most efficient are (1) the square disc 7 illustrated in Figs. 3 and 4, and provided with a central aperture 8, by means of which the member is readily engaged by the end of one's finger to shift said member to the desired position upon said board; or (2) the square disc 9 of Figs. 5 and 6, having a central depressed or concave area 10 for engagement of one's finger tip in lieu of the aperture 8 of the disc 7; or the square disc 11 of Figs. 7 and 8, having a central plano-convex area 12 of increased thickness, which acts as a magnifying glass to visually enlarge the number upon which it is placed.

To illustrate the uses for which the device is designed, it will be assumed that the student is first instructed to multiply six by two. He places a row of the indicating members upon the numerals 1 to 6 in the lowermost horizontal (No. 1) row of square spaces and a similar number of said members in the second row next above, always starting from the left hand side of the board. He then finds that when he has arranged two rows of six members each, as instructed, the last-placed member covers the numeral "12" which is the result of such multiplication, or the product six multiplied by two. If the members used are of the type shown in Figs. 3 and 4, the numeral "12" will be clearly visible through the aperture in the last-positioned member, or through the depressed area of decreased thickness 10 of a member 9 shown in Figs. 5 and 6, while if members 11 are used the "12" is seen as being enlarged, due to the magnification of the central, plano-convex portion 12 of said members. In Fig. 1, these two rows are shown as being composed of the last-mentioned magnifying type of indicating members.

To teach simple problems of division, the pupil is given, for example, fifteen members and told to divide nine by six. He lays one (bottom) row of six members, then a second row of six members, and finally three members in the third row, thereby showing that six is divisible into fifteen two time three remaining. Similarly, for addition, he may be given the problem: four plus two, in which case he lays four members in the said first or bottom row, and then two members in the same row, and beneath the last-laid members the numeral "6" will be visible, and enlarged if members 11 are used. Likewise, if the pupil is given nine members and told to subtract three from nine, he first lays all nine of said members in said bottom row, and from them removes the three members farthest to the right, with the result that the numeral visible beneath the farthest remaining member in said row is "6".

It is a widely recognized fact that while many children can learn arithmetic satisfactorily by memorizing it as sounds of the numbers involved, with isolated examples written out on paper or blackboard, probably many more children learn the same subject much faster if it can be mentally "seen" upon a numbered board, similar to the approved method of teaching one of the first steps in algebra, by using the degrees of a thermometer above and below zero to indicate the addition and subtraction of "plus" and "minus" signed numerals. Consequently, a child using the board herein described and illustrated will involuntarily carry with him through life a mental image of such board, and from experience it has been found that such an individual will much more readily and thoroughly master his ever essential multiplication tables, and the frequent calculations that are presented to the average person daily.

After a child has solved numerous problems in multiplication, by filling whole sections of the horizontal rows, in order to reach the product indicated by horizontal and vertical coordinates, he will realize that by using two designated coordinates he can just as accurately and in much less time place a single indicating member upon that single numeral, which he finds at the intersection of a horizontal row with a vertical row, identified by the multiplier and the multiplicand in the respective vertical and horizontal series of marginal figures, and if he uses a magnifying indicator member the product indicated will be enlarged and thus stand out in contrast to the apparently smaller surrounding numerals. Conversely, by selecting any particular "result" number in the body of the board, and following the respective horizontal and vertical rows at the intersection of which it appears, will indicate to him two factors by which such number is produced.

Referring to Fig. 9, the board 13 here shown has a central body portion 14, which is perfectly plain as compared with the numeraled surface of the corresponding portion of the first-described board 1. This central portion is surrounded by a raised frame, comprising a left hand portion 15, a bottom portion 16, a right hand portion 17 and an upper or top portion 18 whose inner edges form shoulders for abutment by the aforesaid training pieces. Upon said left hand portion is a vertical series of numerals of any range that the available space permits, and in the drawing is represented as running from "1" to "15," to indicate the horizontal rows of indicating members 19 that may be laid from left to right across said central portion, always beginning with the bottom row "1." The bottom portion 16 of said frame is provided with numbers beginning with "1" at its left end and progressing towards the right, and in the drawing these numerals extend from "1" to "30."

A single (No. 1 horizontal) row of members 19 is laid from 1" to 30," where it stops slightly short of the right hand frame portion 17, whence the progression of said members extends upwardly opposite numerals "31" to "44." These last-mentioned members rest upon the last (No. 30) member of the bottom row, and they also terminate short of the upper frame portion 18. Then, against the uppermost member opposite the numeral "44" abuts the first of a series of members laid abreast numerals "45" to "69" upon said top frame portion, said last-mentioned series of numerals progressing from right to left, so that a relatively long series of members may be added together by the pupil, in the illustration given such series extending from "1" to "69." Obviously, any shorter total may be attained, while the board may be sectional, or of a more elongated single section, there being theoretically no limit to the numerals that may be provided. Shown in double-dot-and-dash lines are indicated two additional horizontal rows 20 of twelve members each that begin, like said first row, with the numeral "1" on the left frame portion and progress towards the right.

This arrangement may be used for multiplication, as for instance to represent the product of three times twelve, when the first-laid row stops at "12" like the second and third rows. Similarly subtraction and division may be worked out, as in the form of the device first described. However, by arranging a continuous series of numerals around three sides (bottom, right and top) of the board, a much more extended computation can be provided for, than when only a single side or bottom is numbered. Thus, the invention possesses numerous modifications and arrangements within the scope of the appended claim.

Having thus described my invention, what I claim and desire to protect by Letters Patent of the United States is:

A teaching device comprising a rectangular board, training pieces movable thereover, four raised portions each bordering a side of said board and providing shoulders at their inner edges for abutment by said training pieces, two of said raised portions each bearing a sequential set of numerals progressing equidistantly from each other and from the junction of said raised portions, the common zero of said sets being at said junction, and a series of numerals on the two remaining raised portions forming a sequential continuation of the numerals on one of said first two portions.

ALBAN E. ROGERS.

REFERENCES CITED

The following references are of record in the file of this patent:

UNITED STATES PATENTS

| Number | Name | Date |
|---|---|---|
| 179,483 | Lewis | July 4, 1876 |
| 438,757 | Bliss | Oct. 21, 1890 |
| 456,708 | Preston | July 28, 1891 |
| 690,446 | Levy | Jan. 7, 1902 |
| 717,105 | Mansfield | Dec. 30, 1902 |
| 722,994 | King | Mar. 17, 1903 |
| 723,425 | Thompson | Mar. 24, 1903 |
| 898,587 | Matthias | Sept. 15, 1908 |
| 979,923 | Boore et al. | Dec. 27, 1910 |
| 1,162,629 | Mager | Nov. 30, 1915 |
| 1,310,997 | Linay | July 22, 1919 |
| 1,400,887 | Liebman | Dec. 20, 1921 |
| 1,403,989 | Verneau | Jan. 17, 1922 |
| 1,563,215 | Meyer | Nov. 24, 1925 |
| 1,649,578 | Deming | Nov. 15, 1927 |
| 1,719,108 | Fennell | July 2, 1929 |
| 1,895,611 | Doak | Jan. 31, 1933 |